United States Patent
Sjostrand

[11] 3,904,720
[45] Sept. 9, 1975

[54] METHOD OF FORMING BODIES OF FOAMED PLASTISOLS HAVING ALVEOLATE EXTERIOR SURFACES

[76] Inventor: Gerald D. Sjostrand, 4734 E. Home St., Fresno, Calif. 93703

[22] Filed: Dec. 19, 1973

[21] Appl. No.: 426,321

[52] U.S. Cl. .............. 264/45.5; 264/45.6; 264/48; 264/215; 264/234; 264/DIG. 14; 264/DIG. 60; 428/35; 428/305; 428/315
[51] Int. Cl.² .. B29C 5/12; B29C 13/04; B29D 27/04
[58] Field of Search .......... 264/45, 54, 48, DIG. 60, 264/215, 45.5, 45.6, DIG. 14, 234; 161/166

[56] References Cited
UNITED STATES PATENTS

| | | | |
|---|---|---|---|
| 2,711,737 | 6/1955 | Emery | 264/215 X |
| 2,853,400 | 9/1958 | Ahlbin | 264/54 X |
| 3,432,581 | 3/1969 | Rosen | 264/310 X |
| 3,492,307 | 1/1970 | Hoskinson | 264/310 X |

OTHER PUBLICATIONS
"SPI Plastics Engineering Handbook," Third Edition, New York, Reinhold, 1960, pp. 188–197.
Whittington, Lloyd R., "Whittington's Dictionary of Plastics," Stamford, Conn., Technomic, 1968, Preface, pp. 58–60.

*Primary Examiner*—Philip Anderson
*Attorney, Agent, or Firm*—Huebner & Worrel

[57] ABSTRACT

A body of blown plastisol having an alveolate exterior surface and an unctuous inner surface, and a method of forming the same. The body is formed by heating to a selected temperature within a range of 150° to 420° F. an elongated mandrel having a smooth exterior surface, immersing the mandrel in its heated condition for a period of a predetermined duration in a bath of liquid plastisol which includes a plastisol resin and a chemical blowing agent which decomposes at a temperature above fusion temperature for the resin, removing the mandrel and a body of gelled plastisol formed thereabout from said bath of liquid plastisol and immersing the same for a period of a predetermined duration in a liquid bath maintained at a blowing temperature substantially greater than the fusion temperature for said plastisol and thereafter removing the mandrel and the body from the liquid bath and immersing the same in a relatively cool bath of washing liquid.

5 Claims, 3 Drawing Figures

METHOD OF FORMING BODIES OF FOAMED PLASTISOLS HAVING ALVEOLATE EXTERIOR SURFACES

BACKGROUND OF THE INVENTION

The invention relates to a method of forming a body of blown plastisol and more particularly to a body of blown plastisol having an alveolate exterior surface and an unctuous inner surface. As herein employed, the term alveolate exterior surface refers to a surface having a pitted appearance formed through a rupture of a myriad of randomly disposed, expanded cells. The term unctuous surface refers to a substantially smooth, slick surface, while the term blown plastisol is intended to mean a low-density plastisol having a cross-sectional appearance conforming to that of a sponge.

Of course, the prior art is replete with formulations for plastisols, or non-aqueous vinyl dispersions, as well as formulations for chemically blown plastisols, including both those having a closed-cell structure and an open-cell structure. One of the advantages of blown plastisols is that in many instances and for a large number of purposes it competes quite readily with foamed rubber and is substantially cheaper to manufacture.

As can readily be appreciated by those familiar with the art of preparing and blowing plastisols, or vinyl dispersions, formulations vary over a wide range. The materials included in plastisols divide naturally into two main categories. These are the liquid components consisting of plasticizers, volatile diluents, wetting agents and most stabilizers, and the dry ingredients consisting of resins, fillers, pigments, and stabilizers. A typical formulation for a chemically blown vinyl dispersion is, in parts by weight, as follows:

CHEMICALLY BLOWN FOAMS
(Basically Closed Cell Structure)

|  | Soft Foam | Filled Soft Foam | Hard Foam | Filled Hard Foam |
|---|---|---|---|---|
| PVC emulsion plastisol resin homopolymer[a] | 70 | 70 | 70 | 70 |
| Extender resin[b] | 30 | 30 | 30 | 30 |
| DOP | 20 | 80 | 50 | 50 |
| BBP | 70 | 10 | 10 | 10 |
| Epoxy plasticizer | 5 | 5 | 5 | 5 |
| Blowing paste - azodicarbonamide | 6 | 6 | 6 | 5 |
| Zinc blowing catalyst | 3 | — | — | — |
| Dibasic lead phosphite | — | — | 6 | 5 |
| Ba-Cd-Zn stabilizer | — | 3 | — | — |
| $CaCO_3$ | — | 20–25 | — | 20–25 |
| Surfactant | 1.5 | — | — | 2 |
| Approximate foam density lb/cu ft | 19 | 21.5 | 20 | 22.5 |
| Blowing temperature | 360°F. | 360°F. | 360°F. | 365°F. |

[a] Diamond PVC-7602, inherent viscosity 0.90.
[b] Diamond PVC 7-44, inherent viscosity 0.83.

The most commonly used chemical blowing agent is azodicarbonamide, which produces foam with a high closed-cell content. Through a selection of the heat stabilizer-activator, the temperature at which expansion will occur can be adjusted. Depending upon the characteristics of the resin employed, and other ingredients in the formulation, a blowing system can be chosen which will yield the desired cell structure and foam density at the required temperature. For example, with a resin having a fusion temperature of 320° F. a blowing agent is chosen which decomposes above 320°, 340° F., for example. This assures retention of gas bubbles within the plastisol and produces the lowest possible foam density.

In the past, it has been common practice to dip a heated mandrel into a body of liquid plastisol, maintained at substantial room temperature, for thus forming a gelled body of plastisol about the mandrel and thereafter transferring the mandrel and the gelled body into a heated air environment. The heated air causes the blowing agent to decompose within the fused body of plastisol, whereby the body is substantially expanded through an introduction of a myriad of cells extending therethrough. However, the exterior surface of the blown plastisol thus formed has an unctuous or substantially slick appearance. As a consequence, the resulting body of blown plastisol is not particularly pleasing to the eye and, similarly, it is not particularly pleasing or reassuring to the tactile senses.

Additionally, one of the inherent disadvantages of the heretofore known techniques for blowing the plastisols is that the resulting bodies tend to have an expanded, low-density cell structure which extends between the opposite surfaces thereof. Of course, where such a body is to be subjected to tensile stress, it is desirable to avoid formation of cell structure extended completely between the surfaces of the body in order to increase the strength thereof.

It is therefore a general purpose of the instant invention to provide an improved method for forming a chemically blown plastisol having an alveolate exterior surface and an unctuous inner surface, the density of said body being substantially varied between the surfaces, and a method of forming the same, all without sacrificing desirable qualities of a blown plastisol.

OBJECTS AND SUMMARY OF THE INVENTION

It is therefore an object of the instant invention to provide an improved method for forming a body of blown plastisol having an alveolate exterior surface and an unctuous inner surface and a density which varies between the surfaces thereof.

Another object of the instant invention is to provide an improved method for blown plastisols.

It is another object to provide a method for forming bodies of blown plastisols having an alveolate exterior surface and an unctuous inner surface and a density which varies between the surfaces thereof.

It is another object to provide a method of forming bodies of blown plastisols having an alveolate exterior surface and an unctuous inner surface.

These and other objects and advantages are achieved by dipping a heated mandrel in a liquid bath of plastisols including a blowing agent, for thus forming a gelled body about the mandrel, and thereafter immersing the mandrel in a liquid bath maintained at a temperature, substantially above the fusion temperature of the plastisol, at which the blowing agent decomposes.

BRIEF DESCRIPTION OF THE DRAWINGS

FIG. 3 is a diagrammatic view of a series of stations at which steps of the method embodying the principles of the instant invention are performed for forming the body of blown plastisol illustrated in FIGS. 1 and 2.

DESCRIPTION OF THE PREFERRED EMBODIMENT

Figure 1:
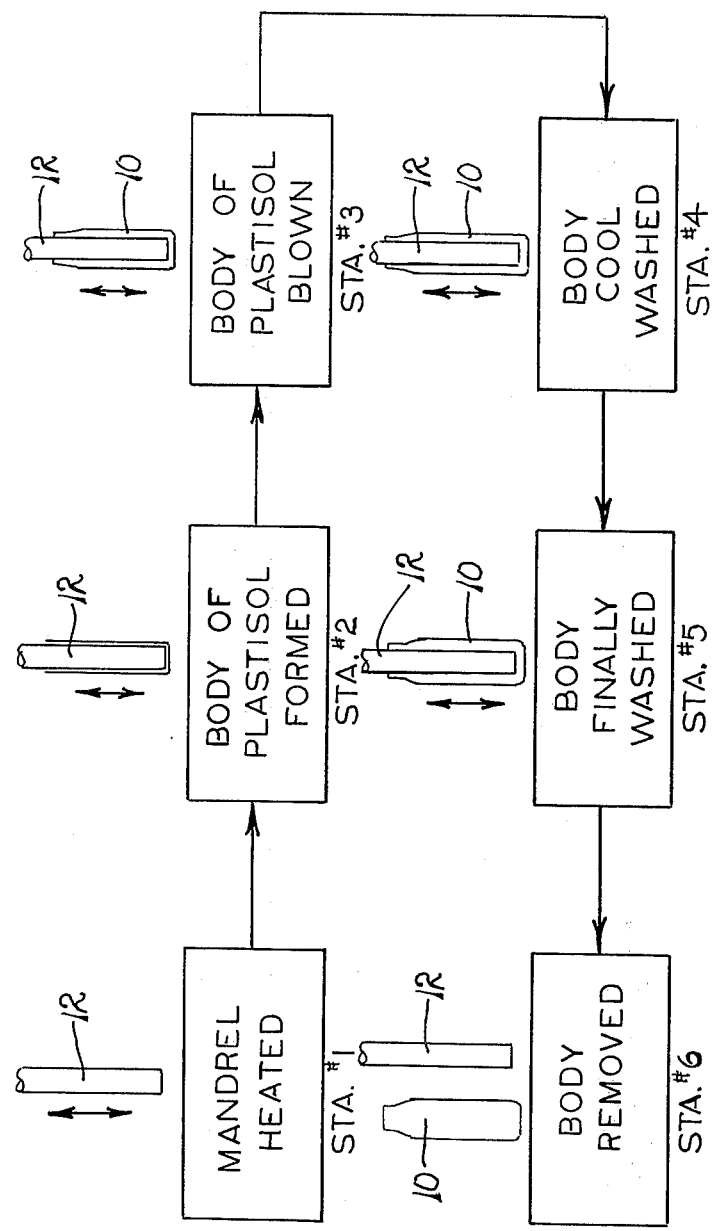
FIG. 1 is a perspective view of a body of blown plastisol which embodies the principles of the instant invention.
Figure 1:
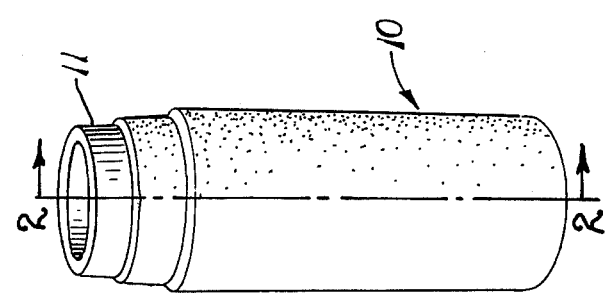

Referring now with more specificity to the drawings, wherein like reference characters designate like or corresponding parts throughout the several views, there is illustrated in FIG. 1 a body 10 formed of blown plastisol, terminating in a neck 11 of unblown plastisol, which embodies the principles of the instant invention. The neck 11 is of any suitable length and exhibits relative high-strength characteristics. Moreover, the neck of unblown plastisol may serve for decorative purposes or provide a mounting surface for a ferrule.

The body 10, terminating in the neck 11, is formed employing a method, which also embodies the principles of the instant invention, the steps of which are diagrammatically depicted in FIG. 1.

As a practical matter, it is to be understood that, while not shown, a suitable apparatus may be employed in performing the method of the instant invention and that the apparatus may be varied as desired. However, a typical apparatus which may be employed in performing the method of the instant invention includes a traveling mandrel, designated 12, depending from an overhead truck and supported for vertical reciprocation.

Figure 2:
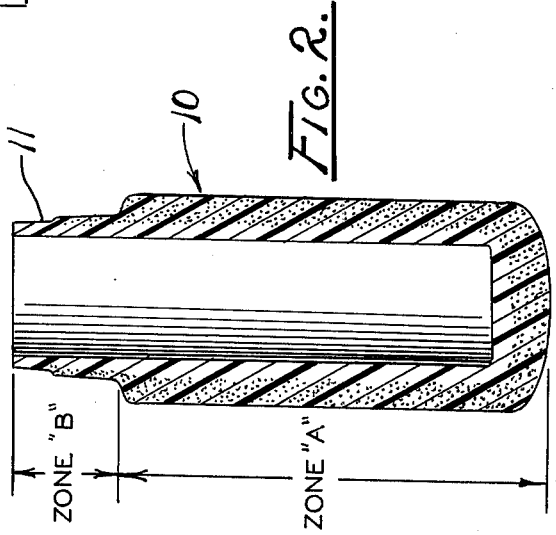
FIG. 2 is a cross-sectional view taken generally along line 2—2 of FIG. 1 depicting the density of the body.

In practice, the mandrel 12 serves as a substrate having a configuration which approximates the configuration of a selected body, such as the body 10, and includes a slick or unctuous surface. As a practical matter, the mandrel is heated in any suitable manner, such as by being moved through a heated chamber, dipped in a heated bath, or provided with an internal heating element. In any event, it is to be understood that a provision is made for heating the mandrel 12 to a temperature sufficient for initiating the formation of a gelled body thereabout when the mandrel 12 is introduced into a liquid bath of plastisol maintained at room temperature.

Where the plastisol or vinyl dispersion being employed is of the type hereinbefore described, the mandrel preferably is heated to a preselected temperature, at a first station, designated station 1 in FIG. 3, and thereafter is transferred to a second station, designated station 2. At the second station the mandrel 12 is immersed in a liquid bath of plastisol, including a suitable blowing agent, and supported therein for a predetermined period whereupon a gelled body 10 of plastisol is caused to form about the mandrel in a manner well understood by those familiar with the art of molding articles from plastisols. Of course, the thickness of the body of gelled plastisol is a function of the duration of the period in which the mandrel is supported in the liquid bath of liquid plastisol, as well as the temperature of the mandrel. Thus the desired temperature of the mandrel 12 and the duration of the period during which the mandrel is immersed in the bath of liquid plastisol can be established empirically, where so desired. Moreover, where the mandrel 12 is heated to a suitable temperature, above the fusion temperature for the plastisol, fusion is thereby initiated by heat transferred to the body from the mandrel. Hence, the mandrel may be heated to a temperature of 420° F. and dipped in the bath of liquid plastisol for periods having durations of 30 to 90 seconds. Additionally, it may be desirable to provide the body 10 with a wall having different thicknesses for increasing the strength and varying the configuration of the body 10. For example, as illustrated in FIG. 2, the body 10 is provided with a first thickness by immersing the mandrel to a first depth, for treating a first zone of the body 10, designated Zone A, for approximately one minute, and thereafter immersing the mandrel to a second depth, for treating an adjacent zone, designated Zone B for a period of approximately 15 to 30 seconds, and then removing the body 10 from the bath.

Of course, once the body 10 of a predetermined thickness has formed about the mandrel 12, the mandrel and the body are removed from the bath of liquid plastisol and transferred to a third station, designated station 3. At station 3 there is provided a liquid bath maintained at a temperature substantially above the fusion temperature of the plastisol and the temperature at which the blowing agent decomposes. A blowing agent which decomposes above the fusion temperature of the plastisol is employed so that as a gas is generated closed cells are formed. Consequently, where the fusion temperature of the plastisol is 320°F., for example, a blowing agent which decomposes at a temperature substantially higher than the fusion temperature, 340°F., for example, should be employed. However, it is desirable to maintain the bath at station 3 at temperatures even higher than the minimum temperature necessary to initiate a blowing process. As is fully understood by those familiar with the art of molding thermoplastic materials, the density of the blown plastisol is a function of the temperature of the bath, since the higher the temperature of the bath the greater is the extent to which decomposition of the blowing agent occurs. A bath of liquid salts is provided for decomposing the blowing agent.

Of course, the neck 11 is formed simply by supporting the body 10 with the bath of salts at a depth such that the upper portion thereof does not penetrate the salt bath at station 3. The mandrel 12 is adequately heated for fusing the plastisol without foaming, by radiant heat derived from the bath of salts. By arresting the blowing action, as the blowing progresses inwardly, the cross sectional density of the body can be controlled quite adequately. Since the cross-sectional density can be varied by arresting the blowing process, the duration of the period for achieving a desired cross-sectional density is determined empirically for a gelled body of plastisol of a given formulation and thickness. Thus, it is possible to provide a body the outer portion of which has a very low density and an inner portion having a very high density. The resulting body is thus rendered lightweight and resilient and possesses suitable strength characteristics.

Additionally, by immersing the body at different depths the effect of the blowing agent is caused to differ at different locations within the body. This is achieved simply by immersing the body 10 to a first depth for an empirically determinable period and thereafter immersing the body to another depth for a second period of an empirically determinable duration, whereby cross-sectional density of the body is caused to vary along the length thereof.

For reasons which are not fully understood, the surface layer of closed cells tends to rupture in the presence of a liquid bath, employed in the manner aforediscussed. The exterior surface thus is provided with a pitted or alveolated appearance. On the other hand, the surface of the body 10 which engages the smooth surface of the mandrel 12 tends to be slick and have an unctuous appearance. While the particular material employed in the bath can be varied as desired, it is to be understood that the material employed should not react with the plastisol and should remain a liquid at temperatures at which the plastisol is blown. Therefore, a bath of sodium and potassium nitrates in an oxidizing compound is particularly suited for this purpose, since these salts form a stable liquid up to 1,300°F.

Once the body of plastisol 10 has been immersed for a period of a determinable duration in the bath of liquid salts, suitable for imparting a desired cross-sectional density to the body, it is extracted and transported to station 4. At this station the body 10 is dipped in a cooling bath of plain water which tends to wash the salt from the surface of the body and rapidly cool the body to a temperature below that at which decomposing of the blowing agent occurs. The mandrel 12 and the body 10 are thereafter passed through a final wash, at a station designated number 5, prior to arriving at a removal station, designated station number 6. At station 6, the body 10 is removed from the mandrel 12 in any suitable manner well understood by those familiar with molding techniques.

While the apparatus hereinbefore described includes a heated mandrel dipped in a bath of liquid plastisol to form a gelled body thereabout, it is to be understood that the body may be deposited on any suitable substrate, in any suitable manner, and immersed in a bath heated to blowing temperatures in any suitable manner. Moreover, since the temperatures at which the blowing is effected can be varied as well as the duration of the period in which blowing occurs, and the density of the resulting body is a function of the temperatures and duration of the periods in which blowing occurs, the depth of the low-density portions of the body can readily be varied.

In view of the foregoing, it should readily be apparent that the method which embodies the principles of the instant invention provides an improved blown plastisol having a particularly pleasing appearance and a surface which is particularly pleasing to the tactile senses and having a high coefficient of friction.

Although the invention has been shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. In a method of forming bodies of blown plastisol having an alveolate exterior surface, the steps of:
   A. depositing on a substrate a gelled body of a non-aqueous vinyl dispersion including a chemical blowing agent which decomposes above the fusing temperature of said dispersion; and
   B. exposing the surface of said body to contact with a heated liquid of a liquid bath maintained at a temperature substantially above the fusion temperature of said vinyl dispersion and at which the blowing agent decomposes for causing said dispersion to fuse and said blowing agent to decompose.

2. In a method of forming bodies of blown plastisol having an alveolate exterior surface and an unctuous inner surface, the steps of:
   A. depositing and gelling on a relatively smooth surface of a mandrel a plastisol resin containing a chemical blowing agent which decomposes above the fusion temperature of said resin;
   B. exposing the surface of said body to contact with the liquid of a liquid bath maintained at a temperature substantially above the fusion temperature for said plastisol resin and at which the blowing agent decomposes;
   C. removing said body from said liquid bath; and
   D. cooling said body to room temperature.

3. The method of claim 2 wherein said plastisol resin is a PVC emulsion plastisol resin homopolymer.

4. A method for forming bodies of blown plastisol having an alveolate exterior surface and an unctuous inner surface comprising the steps of:
   A. heating a mandrel having a substantially smooth exterior surface to approximately 420° F.;
   B. immersing said mandrel in its heated condition in a bath of a liquid plastisol resin composition containing a chemical blowing agent, maintained at substantially room temperatures, for depositing a gelled body of plastisol on the surface of said mandrel;
   C. removing said body from said bath of liquid plastisol and immersing the body in a bath of liquid salts maintained at a temperature greater than the fusion temperature for said plastisol and at which the chemical blowing agent decomposes;
   D. removing said body from said bath of liquid salts and immersing the body in a relatively cool bath of washing liquid; and
   E. removing said body from said mandrel.

5. The method of claim 4 wherein the body is immersed to a first depth and maintained at said first depth for a first period of time and thereafter immersed to a second depth and maintained at said second depth for a second period of time, for thereby varying the density of the body.

* * * * *